United States Patent [19]

Kusijanovic

[11] Patent Number: 5,505,423
[45] Date of Patent: Apr. 9, 1996

[54] ADJUSTABLE ENGINE MOUNT FOR A MODEL AIRPLANE

[76] Inventor: Lucas T. Kusijanovic, Las Flores 462, San Isidro, Lima, Peru

[21] Appl. No.: 247,291

[22] Filed: May 23, 1994

[51] Int. Cl.$^6$ .................................................. F16M 13/00
[52] U.S. Cl. .............................. 248/554; 244/54; 446/57; 248/635; 248/674
[58] Field of Search ..................... 248/554, 556, 248/557, 634, 635, 638, 659, 674, 637; 244/54; 446/57

[56] References Cited

U.S. PATENT DOCUMENTS

| | | | |
|---|---|---|---|
| 4,222,280 | 9/1980 | Stewart | 474/112 |
| 4,249,711 | 2/1981 | Godbersen | 244/54 |
| 5,238,205 | 8/1993 | Gleichauf | 244/54 |
| 5,303,896 | 4/1994 | Sterka | 248/557 |

FOREIGN PATENT DOCUMENTS 2029245  3/1980  United Kingdom ................. 446/57

*Primary Examiner*—Leslie A. Braun
*Assistant Examiner*—Gwendolyn Wrenn
*Attorney, Agent, or Firm*—Malloy & Malloy

[57] ABSTRACT

An adjustable engine mount for use on a model airplane to supportably hold a model airplane engine, the engine mount including an adjustably positionable support bracket having a mount segment which is sandwichly positioned between a first mount panel and a second mount panel, the mount segment and the second mount panel each including an axial opening extending therethrough such that an elongate axial screw which extends from the first mount panel may pass therethrough to enable secured adjustable, single step securing of the mount segment, and accordingly the support bracket, in a selected secured orientation therebetween, thereby aligning the engine disposed on the support bracket in a desired orientation within the model airplane.

8 Claims, 1 Drawing Sheet

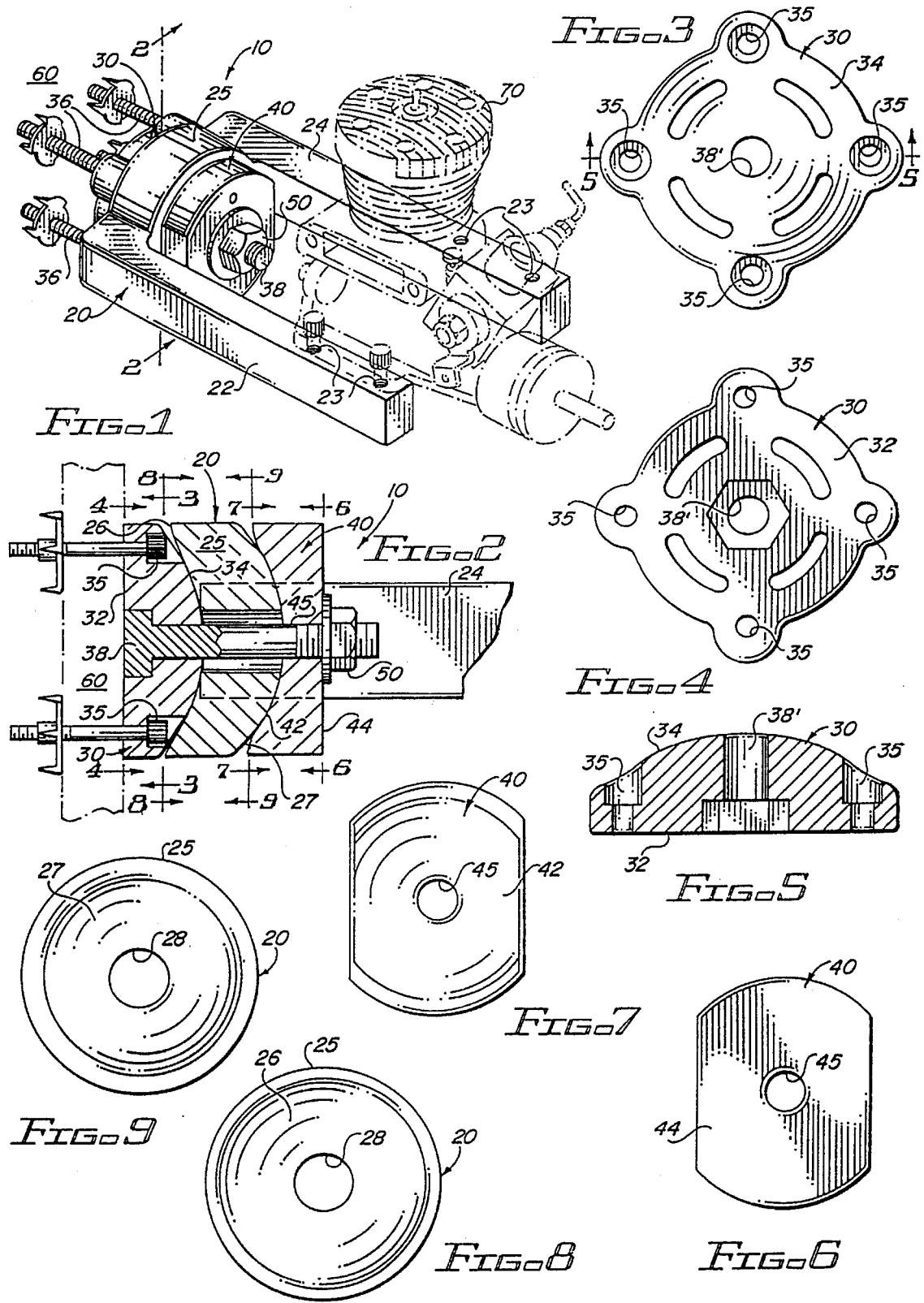

ADJUSTABLE ENGINE MOUNT FOR A MODEL AIRPLANE

BACKGROUND OF THE INVENTION

1. Field of the Invention

The present invention relates to an adjustable engine mount for use within a model airplane, the mount being structured to enable rapid, facilitated, single step adjustment of the orientation of an engine of a model airplane secured to the mount.

2. Description of the Related Art

The building and operation of remote control boats, cars, and especially airplanes, is becoming an increasingly popular and complex hobby. Specifically, with regard to model airplanes, scaled models of real aircraft are increasingly advanced and effective. To meet these increasing needs, small scale model aircraft engines are manufactured in a variety of sizes and configurations adapted to provide high levels of performance and ability to the model airplane. Due to their high output nature, model aircraft engines often become worn or otherwise require replacement, repair or adjustment. When such a replacement of the model aircraft engine is necessary, a new engine cannot simply be purchased and immediately installed for effective use. Rather, once the new engine is mounted within the aircraft, its specific orientation within the aircraft must be continually adjusted until a proper orientation which provides the most effective flight is achieved. Similarly, this adjustment is necessary even if the old engine has merely been temporarily removed or repositioned from its appropriate orientation.

Presently, in order to facilitate interchanging and remounting of model aircraft engines, separate engine mounts are employed. Specifically, the engine is secured to the mount, and the mount rather than the engine itself is directly secured to the model airplane. These model airplane engine mounts presently include a plurality of openings disposed about a periphery thereof wherethrough a screw is utilized to secure the mount to the fire wall of the model aircraft. Once installed, repeated testing and adjustment is undertaken to achieve the proper orientation of the engine. This testing requires continuous unfastening and refastening of the number of screws used to secure the mount to the fire wall in alternating sequences and with no accurate indications. Further, during this adjustment process, the tightening or loosening of one of the plurality of screws may result in a change in alignment which necessitates tightening or loosening of the remaining screws in a countless number of differing patterns and degrees. This traditional type of engine mount, as illustrated in the patents to Gleichauf (U.S. Pat. No. 5,238,205), Stewart (U.S. Pat. No. 4,222,280), and Godbersen (U.S. Pat. No. 4,249,711), utilize a plurality of screws to fasten the mount assembly to the fire wall of the aircraft. Even in the case of the reference to Godbersen which provides for variable pivoted positioning of the engine so as to accommodate mounting in varying size airplanes, there are still a plurality of screws which secure the assembly to the fire wall and which dictate the axial alignment of the engine relative to the airplane. As a result, those screws must be adjusted in the conventional trial and error manner in order to compensate for the torque resulting from the functioning of the engine and its axial alignment. In particular, such torque can result in rotation and/or other unnecessary deviations in the flight path of the airplane, thereby necessitating that the aligned orientation of the engine relative to the aircraft be pivoted axially.

The device of the present invention is designed specifically to eliminate the tedious and difficult adjustment steps necessary in the prior art, wherein small adjustments must be made, the flight tested, and repeated adjustments must be made until after a number of trials, appropriate alignment is achieved. The device of the present invention allows an easier, less time-consuming adjustment.

SUMMARY OF THE INVENTION

The present invention is directed to an adjustable engine mount to be utilized in model airplanes. Specifically, the adjustable engine mount includes an adjustably positionable support bracket whereon the model airplane engine is securely positioned. This support bracket has a mount segment with a first side, a second side, and an axial opening extending therethrough from the first side to the second side. Also included as part of the adjustable engine mount are a first mount panel and a second mount panel which are adapted to adjustably secure the mount segment of the support bracket therebetween. The first mount panel includes an inner face and an outer face and is structured to be fixedly secured to a fire wall of the model airplane along its outer face. Extending outwardly from a center of the inner face of the first mount panel is an axial screw. This axial screw is positioned so as to extend through the axial opening in the mount segment of the support bracket thereby enabling the inner face of the first mount panel to matingly contact the first side of the mount segment of the support bracket. Also adapted to be disposed over the axial screw is the second mount panel which includes an inner surface, an outer surface, and an axial opening extending therethrough from the inner surface to the outer surface so as to receive the axial screw therein. Specifically, the second mount panel is adapted to be positioned such that upon receipt of the screw through the axial opening, the inner surface of the second mount panel will matingly contact the second side of the mount segment of the support bracket. Fastening means fixedly secure the first mount panel to the fire wall, and tightening means are disposed on the axial screw to adjustably secure the mount segment between the first mount panel and the second mount panel. More particularly, the tightening means are adapted to enable simplified, single step adjustment of the secured orientation of the mount segment between the first mount panel and the second mount panel thereby enabling axial alignment of the engine disposed on the support bracket in an appropriate orientation within the model airplane so as to reduce the effects of torque during flight.

It is an object of the present invention to provide an improved adjustable engine mount which eliminates the need for repeated trial and error steps of adjustment in order to properly orient an engine within a model airplane in order to eliminate flight deviations resulting from torque.

Still another object of the present invention is to provide an adjustable engine mount which necessitates only a single step process to properly axially orient and align an engine mounted within a model airplane.

Yet another object of the present invention is to provide an adjustable engine mount which enables multi-directional, aligned orientation of an engine mounted within the model airplane merely be adjusting a single tightening means.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the adjustable engine mount in use to support a model airplane engine.

FIG. 2 is a cross-sectional view of the adjustable engine mount of the present invention along line 2—2 of FIG. 1.

FIG. 3 is an inner face view of the first mount panel of the adjustable engine mount of the present invention.

FIG. 4 is an outer face view of the first mount panel of the adjustable engine mount of the present invention.

FIG. 5 is a cross-sectional view of the first mount panel of the adjustable engine mount of the present invention along line 5—5 of FIG. 3.

FIG. 6 is an outer surface view of the second mount panel of the adjustable engine mount of the present invention.

FIG. 7 is an inner surface view of the second mount panel of the adjustable engine mount of the present invention.

FIG. 8 is a first side view of the mount segment of the adjustable engine mount of the present invention.

FIG. 9 is a second side view of the mount segment of the adjustable engine mount of the present invention.

Like reference numerals refer to like parts throughout the several views of the drawings.

DETAILED DESCRIPTION OF THE PREFERRED EMBODIMENT

As shown throughout the figures, the present invention is directed towards an adjustable engine mount, generally indicated as 10. The engine mount 10 is preferably adapted for use within a model airplane so as to supportably hold a model airplane engine 70 in a proper flight orientation therein. Specifically, the adjustable engine mount 10 includes an adjustably positionable support bracket 20 whereon the engine 70 is secured. This support bracket 20 is preferably generally U-shaped including a pair of spaced support members 22 and 24, and a mount segment 25 disposed in interconnecting relation therebetween. This mount segment 25 includes a first side 26, a second side 27, and an axial opening 28 extending therethrough from the first side 26 to the second side 27. The support members 22 and 24 of the support bracket 20 extend outwardly from a periphery of the second side 27 of the mount segment 25. Disposed near a free distal end of each of the support members 22 and 24 are a plurality of mount apertures 23 through which the engine 70 is secured, preferably utilizing a plurality of elongate bolts.

Adapted to sandwich the mount segment 25 supportably and adjustably therebetween are a first mount panel 30 and a second mount panel 40. Specifically, the first mount panel 30 includes an outer face 32, and an inner face 34, and is structured to be secured to a fire wall 60 of the model airplane along this outer face 32. In order to secure this first mount panel 30 to the fire wall 60, fastening means, preferably in the form of a plurality of elongate bolts 36 are utilized. In order to facilitate unhindering fastening, the first mount panel 30 includes a plurality of fastener channels 35 which extend from the outer face 32 to the inner face 34. These fastener channels 35, which are preferably adapted for use with the bolts 36 having an elongate fastener portion and a slightly larger head portion, are specifically sized and configured such that once the bolts 36 are securely fastened to the fire wall 60, the head portion of the bolts 36 are recessed within the fastener channels 35. This recessed positioning maintains a smooth contour along the inner face 34 of the first mount panel 30. Extending axially outward from a center of the inner face 34 of the first mount panel 30 is an axial screw 38. This axial screw 38, which may be threaded along its entire length or along a free distal end thereof, is structured to extend through the axial opening 28 of the mount segment 25 of the support bracket 20, and may be formed integrally with the first mount panel 30 or disposed in a flush orientation within an axial opening 38' formed in the first mount panel 30.

Turning to the second mount panel 40, it includes an inner surface 42, an outer surface 44, and an axial channel 45. The axial channel 45, which is sized to correspond the dimension of the axial channel 28 within the mount segment 28, is also adapted to receive the axial screw 38 therethrough.

The axial screw 38 must be sufficiently elongate to extend through both the mount segment 25 and the second mount panel 40, thereby enabling the first mount panel 30 and the second mount panel 40 to sandwich the mount segment 25 of the support bracket 20 therebetween. Specifically, the inner face 34 of the first mount panel 30 is adapted to matingly contact the first side 26 of the mount segment 25. Similarly, the inner surface 42 of the second mount panel 40 is adapted to matingly contact the second side 27 of the mount segment 25 subsequent to passage of the axial screw 38 therethrough. The respective mating surfaces of the first mount panel 30, mount segment 25, and second mount panel 40, are specifically contoured to facilitate slight adjustments therebetween when necessary. As a result, tightening means, preferably in the form of a threaded nut 50, are included to be secured on the free distal end of the axial screw 38. Due to the elongate axial screw 38 and the mating contact of the respected confronting surfaces, the use of the tightening means 50 enables simplified, single step, adjustable securing of the mount segment 25, and accordingly, the support bracket 20, in a selected secured axial orientation between the first mount panel 30 and the second mount panel 40. This is of particular importance when aligning the engine 70 relative to the airplane. The orientation must be achieved in order to minimize the flight deviating effects of the torque resultant from the functioning of the engine 70. In particular, when a new engine 70 is installed, repeat axial pivoting of the engine 70 relative to the airplane must be performed so as to find the appropriate orientation to minimize unwanted turning or spinning of the airplane during flight. By utilizing the axial screw 38 and tightening means 50, loosening or tightening of the single nut 50 will achieve the adjustment that previously required a number of trial and errors involving the tightening and loosening of a number of screws in a number of sequences.

In a preferred embodiment of the present invention, as illustrated in the figures, the inner face 34 of the first mount panel 30 and the first side 26 of the mount segment 25, as well as the second side of the mount segment 27 and the inner surface of the second mount panel 40 include corresponding concave/convex surfaces. By utilizing the mating engagement of a convex surface with a concave surface, a greater degree of adjusted orientation may be achieved simply by tightening or loosening the mating contact of the confronting faces with one another.

As an additional feature, the first panel 30 or second panel 40 may include a plurality of notched out portions so as to minimize the material requirements of forming the particular piece as well as to minimize the overall weight of the particular piece. This is achieved so long as the overall structure and function of the particular piece is not varied due to the notched out portions.

It is contemplated that the present invention as described herein illustrates the preferred embodiment of the adjustable engine mount. Further variations consistent with the spirit of the present invention as disclosed in the specification and recited in the claims, and further as necessitated by the doctrine of equivalents, should also be deemed incorporated herewith. Also, the preferred use contemplated involves use within a model airplane, however, mounting of a similar model engine structure within various other model vehicles may also be included.

Now that the invention has been described,

What is claimed is:

1. To be utilized in a model airplane, an adjustable engine mount comprising:

an adjustably positionable support bracket structured and disposed to receive a model airplane engine securely thereon, said support bracket including a mount segment having a first side, a second side, and an axial opening extending therethrough from said first side to said second side, a first mount panel and a second mount panel structured and disposed to adjustably secure said mount segment therebetween, said first mount panel including an inner face and an outer face and being structured to be fixedly secured to a fire wall of the model airplane along said outer face, said first mount panel further including an axial screw extending outwardly from a center of said inner face, said axial screw being structured and disposed to extend through said axial opening in said mount segment of said support bracket such that said inner face of said first mount panel matingly contacts said first side of said mount segment of said support bracket, said second mount panel including an inner surface, an outer surface, and an axial opening extending therethrough from said inner surface to said outer surface, said axial opening in said second mount panel being structured and disposed to receive said axial screw therethrough such that said inner surface of said second mount panel matingly contacts said second side of said mount segment of said support bracket, fastening means structured and disposed to secure said first mount panel to the fire wall, and tightening means disposed on said axial screw and structured to enable simplified, single step, adjustable securing of said mount segment, and accordingly said support bracket, in a selected secured orientation between said first mount panel and said second mount panel, so as to align the engine disposed on said support bracket in a desired orientation within the model airplane.

2. An adjustable airplane mount as recited in claim 1 wherein said inner face of said first mount panel is concave and said first side of said mount segment of said support bracket is convex, said concave inner face and said convex first side matingly engaging one another such that single step adjustable positioning of said tightening means on said axial screw results in aligning adjustment of support bracket within the model airplane.

3. An adjustable airplane mount as recited in claim 1 wherein said inner face of said first mount panel is convex and said first side of said mount segment of said support bracket is concave, said convex inner face and said concave first side matingly engaging one another such that single step adjustable positioning of said tightening means on said axial screw results in aligning adjustment of support bracket within the model airplane.

4. An adjustable airplane mount as recited in claim 2 wherein said inner surface of said second mount panel is concave and said second side of said mount segment of said support bracket is convex, said concave inner surface and said convex second side matingly engaging one another such that single step adjustable positioning of said tightening means on said axial screw results in aligning adjustment of support bracket within the model airplane.

5. An adjustable airplane mount as recited in claim 2 wherein said inner surface of said second mount panel is convex and said second side of said mount segment of said support bracket is concave, said convex inner surface and said concave second side matingly engaging one another such that single step adjustable positioning of said tightening means on said axial screw results in aligning adjustment of support bracket within the model airplane.

6. An adjustable airplane mount as recited in claim 3 wherein said inner surface of said second mount panel is concave and said second side of said mount segment of said support bracket is convex, said concave inner surface and said convex second side matingly engaging one another such that single step adjustable positioning of said tightening means on said axial screw results in aligning adjustment of support bracket within the model airplane.

7. An adjustable airplane mount as recited in claim 3 wherein said inner surface of said second mount panel is convex and said second side of said mount segment of said support bracket is concave, said convex inner surface and said concave second side matingly engaging one another such that single step adjustable positioning of said tightening means on said axial screw results in aligning adjustment of support bracket within the model airplane.

8. An adjustable airplane mount as recited in claim 1 wherein said support bracket includes spaced support members extending outwardly from second side of said mount segment, said support member being structured and disposed to supportably maintain the engine securely thereon.

* * * * *